(12) United States Patent
Patel et al.

(10) Patent No.: US 6,760,362 B2
(45) Date of Patent: Jul. 6, 2004

(54) DYNAMIC PILOT FILTER BANDWIDTH ESTIMATION

(75) Inventors: Shimman Patel, San Diego, CA (US); Andrew Kan, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 163 days.

(21) Appl. No.: 10/128,392

(22) Filed: Apr. 22, 2002

(65) Prior Publication Data

US 2003/0198283 A1 Oct. 23, 2003

Related U.S. Application Data (60) Provisional application No. 60/364,795, filed on Mar. 15, 2002.

(51) Int. Cl.[7] .......................... H04B 1/69; H04B 1/707; H04B 1/713
(52) U.S. Cl. ....................................... 375/147; 375/350
(58) Field of Search ............................... 375/147, 148, 375/321, 326, 346, 350; 370/335, 342, 286

(56) References Cited

U.S. PATENT DOCUMENTS 6,055,231 A * 4/2000 Mesecher et al. ........... 370/342

6,493,329 B1 * 12/2002 Leung ......................... 370/335

FOREIGN PATENT DOCUMENTS

| EP | 0901239 | 3/1999 |
|----|---------|--------|
| WO | 015332 | 3/2001 |

* cited by examiner

*Primary Examiner*—Stephen Chin
*Assistant Examiner*—Curtis Odom
(74) *Attorney, Agent, or Firm*—Philip R. Wadsworth; Charles D. Brown; Timothy F. Loomis (57) ABSTRACT

A method and apparatus to dynamically adjust parameters of a filter for a pilot signal. An incoming signal containing a pilot signal is filtered using non-identical filters, and the magnitudes of the filtered signals are compared to estimate a bandwidth of the pilot signal. Noise in the incoming signal may also be estimated, preferably from a portion of the incoming signal not expected to contain the pilot signal. Based on the comparison of the filtered signal magnitudes, which may be compensated to remove the noise contribution, the parameters of a filter applied to the incoming signal to isolate the pilot signal are varied. The parameters may vary the bandwidth of a pilot signal filter. The non-identical filters used in the pilot signal bandwidth estimation may be IIR or FIR filters having different passbands, or may be a correlation of the incoming signal with sinusoids of different frequencies.

30 Claims, 5 Drawing Sheets

DYNAMIC PILOT FILTER BANDWIDTH ESTIMATION

RELATED APPLICATIONS

The present application claims priority of U.S. provisional application Ser. No. 60/364,795 filed Mar. 15, 2002 entitled "Dynamic Pilot Filter Bandwidth Estimation," incorporated herein by reference.

BACKGROUND OF THE INVENTION

1. Field of the Invention

The invention relates to the field of communication devices. More particularly, the invention relates to communication signal recovery.

2. Description of the Related Art

Communication systems that are subject to frequency shifts and multipath interference may employ pilot signals along with information signals, with the pilot signal largely serving as a reference to aid in the precise demodulation of the information. Mobile devices, in particular, may be subject to frequency and phasing shifts caused by Doppler effects, to fading and multipath interference, and a predictable pilot signal may serve to simplify the interpretation of a received signal in the presence of such effects. Accordingly, pilot signals may accompany primary information signals in many communication systems, especially mobile communications systems, and particularly those using spread spectrum Code Division Multiple Access (CDMA) transmission techniques.

A CDMA system may be designed to support one or more CDMA standards such as (1) the Telecommunications Industry Association (TIA)/Electronic Industries Association (EIA) "TIA/EIA-95 Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the CDMA 2000 standard), and (4) some other standards. A pilot signal may, for example, serve in each of the described CDMA systems as a phase reference for demodulating a traffic signal or a data signal.

However, when the pilot signal itself is subjected to substantial noise, such as may be caused by fading, multipath interference or loss of signal strength, the ability to precisely determine the pilot signal timing is degraded, impairing its functionality. In conditions where a receiver is moving at a high rate of speed relative to the transmitter, or in conditions of low Signal to Noise Ratio (SNR) the bandwidth and amplitude of the pilot signal can change drastically from nominal conditions. Under high-speed conditions, Doppler effects may cause the pilot signal bandwidth to increase beyond a filter bandwidth, resulting in a loss of part of the signal. The loss of a portion of the pilot signal degrades receiver performance. Thus, in order to enhance the ability of pilot signals to aid in the reconstruction of other information signals, there exists a need for improvements in the ability to resolve pilot signals in the presence of noise and other distortions.

SUMMARY OF THE INVENTION

A method and apparatus are disclosed wherein a pilot signal is received and the bandwidth of the pilot signal is estimated, and based on that information the bandwidth of a pilot filter is adjusted. The pilot signal bandwidth may be estimated by comparing a pilot signal power over two or more different frequency ranges. The two or more different frequency ranges over which the power of the pilot signal is evaluated may be established in at least three ways. First, the frequency ranges may overlap each other. For example, the first frequency range, H1, may be a lowpass frequency defined from 0 Hz to a particular cutoff, while the second frequency range, H2, spans 0 Hz to a cutoff frequency exceeding that of H1, so that the frequency range of H2 encompasses that of H1. Second, the frequency ranges may be substantially non-overlapping, for example with H1 ranging from 0 Hz to a first frequency, and H2 defining a frequency band which begins and ends at a frequency higher than the cutoff frequency of H1. Third, the frequency ranges may be established by approximating a Fourier transform of the pilot signal source at two or more frequencies, such as by performing correlations of the pilot signal source with two or more selected signals having different frequencies.

In each case, the magnitude of the signal in the two or more frequency bands is determined, typically by evaluating the signal in terms related to signal power. The noise magnitude, such as power per unit bandwidth, may also be estimated, such as by sampling the pilot signal source over a frequency range which is definitely out-of-band for the pilot signal, and the noise magnitude thus determined may be subtracted from the raw magnitude observed in the two or more frequency bands in order to obtain a better estimate of the magnitude of the pilot signal alone within the two ranges. Then, the ratio of the net signal magnitude in the two or more bands will be used to more accurately select the filter to be applied to the pilot signal source to isolate the pilot signal filter. Evaluating more frequency bands or points may provide a better indication of the appropriate filter bandwidth to use for the pilot signal.

BRIEF DESCRIPTION OF THE DRAWINGS

The features, objects, and advantages of the invention will become more apparent from the detailed description set forth below when taken in conjunction with the drawings in which like reference characters identify correspondingly throughout.

DETAILED DESCRIPTION OF EMBODIMENTS OF THE INVENTION

The aspects, features and advantages of the invention will be better understood by referring to the following detailed description in conjunction with the accompanying drawings. These drawings and the associated description are provided to illustrate embodiments of the invention, and not to limit the scope of the invention.

The following detailed description is directed to certain specific embodiments of the invention. However, the invention can be embodied in a multitude of different ways as defined and covered by the claims. Therefore, the scope of the invention should be determined by reference to the appended claims, and in particular should not be limited to the embodiments described.

In order to improve the ability to resolve pilot signals, the incoming pilot signal is subjected to filtering to reduce out-of-band noise. However, the bandwidth of the pilot signal varies as a function of the Doppler, fading and multipath effects. As the pilot bandwidth varies, the effectiveness of any fixed frequency filter also varies. As such, the pilot filter can be made more effective if its frequency is adjusted to match the present bandwidth of the pilot signal. In order to accomplish this, the present bandwidth of the pilot signal is estimated, and based on that information the pilot filter is adjusted.

In general, the magnitude of the pilot signal is measured for two or more different frequency ranges. A noise estimate, for noise that is independent of the pilot signal, may also be made and used to improve the signal magnitude estimates. The magnitude estimates may be based, for example, upon signal power, or upon signal amplitude. The pilot filter frequency response is changed depending upon the ratio of pilot signal magnitudes in the two or more ranges.

Figure 1:
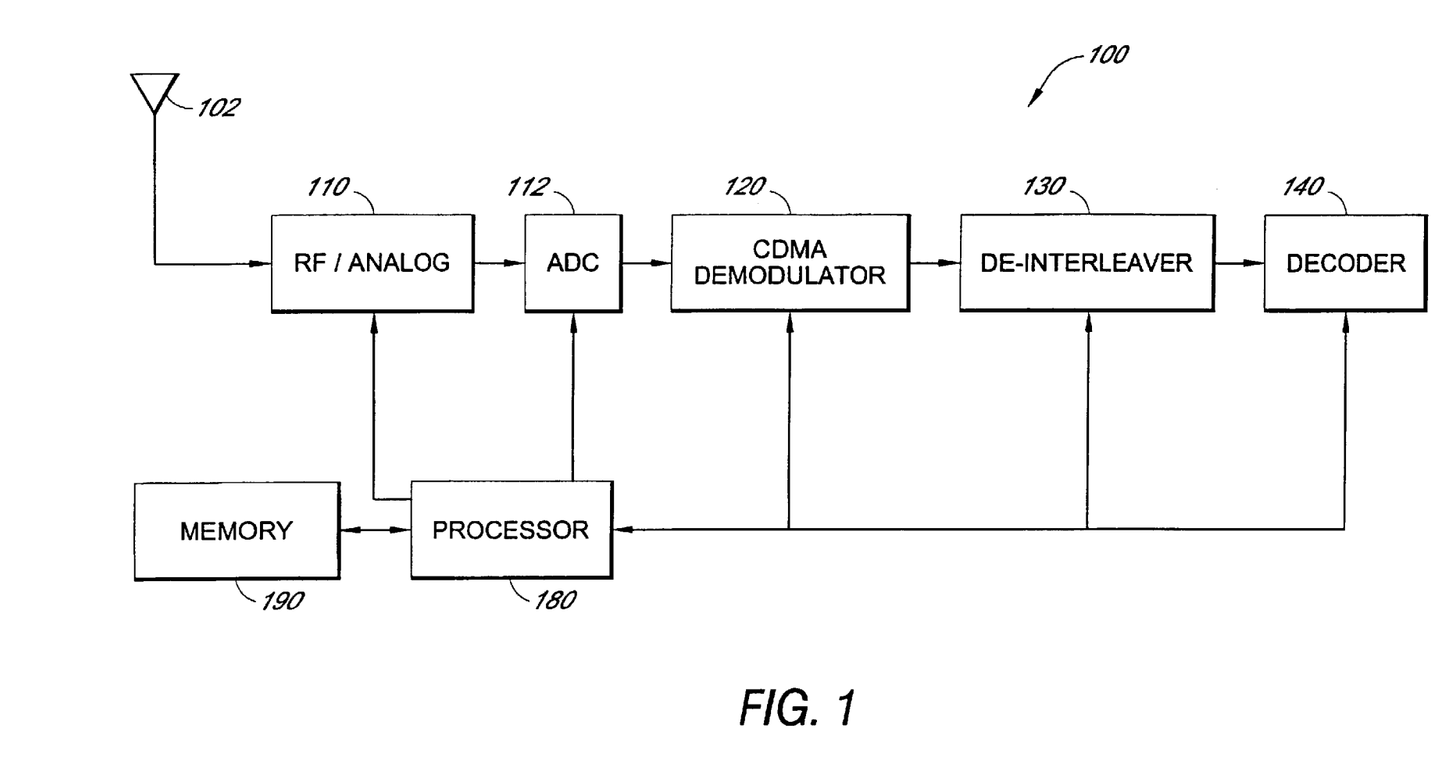
FIG. 1 shows a mobile device for receiving a pilot signal along with a channel signal.

FIG. 1 shows a functional block diagram of a receiver 100 illustrative of what may be used in a CDMA wireless phone operating in a communication system that is compliant with the IS-95 or CDMA 2000 system standards. The receiver 100 may represent one half of a transceiver.

A signal, which may include a pilot signal, is modulated at a transmitter in accordance with specified signal standards and is then transmitted to the receiver 100. An antenna 102 at the front end of the receiver 100 interfaces the receiver 100 to the wireless communication link. The received signal at the output of the antenna 102 is coupled to a Radio Frequency (RF)/analog section 110. The RF/analog section 110 is typically used to tune the receiver 100 to a specific assigned frequency band, downconvert the received signal to a lower frequency signal, filter the signal, and amplify the signal. The output of the RF/analog section 110 is an analog signal that may be at a low Intermediate Frequency (IF) or at baseband. If the received signal is Quadrature Phase Shift Key (QPSK) modulated, the RF/analog section 110 may output an In-phase (I) signal as well as a Quadrature (Q) signal. The processed analog signal is then coupled to an Analog to Digital Converter (ADC) 112 where the signal is sampled and converted to a digital representation.

The digital representation of the received signal is then coupled to a CDMA demodulator 120 where direct sequence spreading is removed from the incoming signal. The CDMA demodulator may represent the functional block where pilot signal recovery may occur. In an IS-95 or CDMA 2000 system, the pilot signal is a bit stream of zeros that is spread with a zero Walsh code. The pilot signal chips are encoded with short pseudo noise (PN) sequences used to isolate one cell or sector from another. The offset enables reuse of the Walsh codes in every sector. Correlation with the PN sequence used to encode the pilot signal recovers the phase of the pilot signal.

The resulting despread symbols are then coupled to a deinterleaver 130. The transmitted signal may be interleaved in order to lessen the effects of a burst of errors that may be caused, for example, by a fast signal fade due to destructively combining multipaths at the receiver front end. Interleaving the symbols before transmission and deinterleaving after reception causes bursts of errors to be spread out in time and to appear to the decoder as if they were random errors. The deinterleaver 130 performs block deinterleaving on the received symbols to rearrange the symbols to the order they were in prior to interleaving at the transmitter. The deinterleaved symbols are then coupled to the input of a decoder 140.

The symbols are decoded in a manner consistent with the encoding process used in the transmitter. Different channels in the communication link may use different types of Forward Error Correction (FEC). Some channels may use different types of FEC depending on the particular radio configuration. For example, symbols may be convolutionally encoded or turbo encoded depending on the supported radio configuration.

The receiver 100 may implement a convolutional decoder, such as a Viterbi decoder, as the decoder 140 when the symbols are convolutionally encoded and the receiver 100 may implement a turbo decoder as the decoder 140 when the symbols are turbo encoded. The decoded bits that are outputted from the decoder 140 may also include other signal quality indicators such as parity bits or Cyclic Redundancy Check (CRC) bits. The output of the decoder 140 may be coupled to additional processing stages or may be coupled to a destination, such as a control register or user interface. The subsequent stages are not shown in FIG. 1 for purposes of clarity.

Each of the stages in the receiver 100 may be operationally coupled to a processor 180. The processor may interface with, and receive instructions from, memory 190. The processor may manage, assist, or perform some of the receiver tasks. Additionally, the processor 180 may communicate the results from one of the functions to another of the functions in the receiver.

Because noise impairs accurate resolution of the pilot signal, a pilot signal filter may be used to limit the noise bandwidth of the received signal. A pilot signal filter that has a bandwidth that is much wider than the bandwidth of the pilot signal has a corresponding noise bandwidth that is not optimized. An excessive noise bandwidth on the pilot signal filter reduces the SNR of the received pilot signal. When the communication link is operating under low SNR conditions, the excess noise bandwidth may significantly reduce the ability of the receiver to recover the pilot signal.

The pilot signal filter should not have a bandwidth that is significantly smaller than the bandwidth of the pilot signal because then portions of the pilot signal may be attenuated by the filter. A narrow bandwidth pilot signal filter may result in a loss of a portion of the pilot signal and slow reaction time to fast fading conditions.

The pilot signal filter may be implemented in analog form prior to the ADC or may be implemented as a digital filter after the ADC. When the pilot signal filter is implemented as a digital filter, the pilot signal filter preferably does not require a great deal of computation, and preferably does not cause phase delay errors. One way to accomplish this is to use a single-pole Infinite Impulse Response (IIR) filter. The resolved pilot signal may then be used to align the information in a channel signal. The pilot signal filter may take any form, and may for example be a one-pole or two-pole filter, IIR or Finite Impulse Response (FIR) filter if the pilot signal source is sampled and the system is digital.

Figure 2:
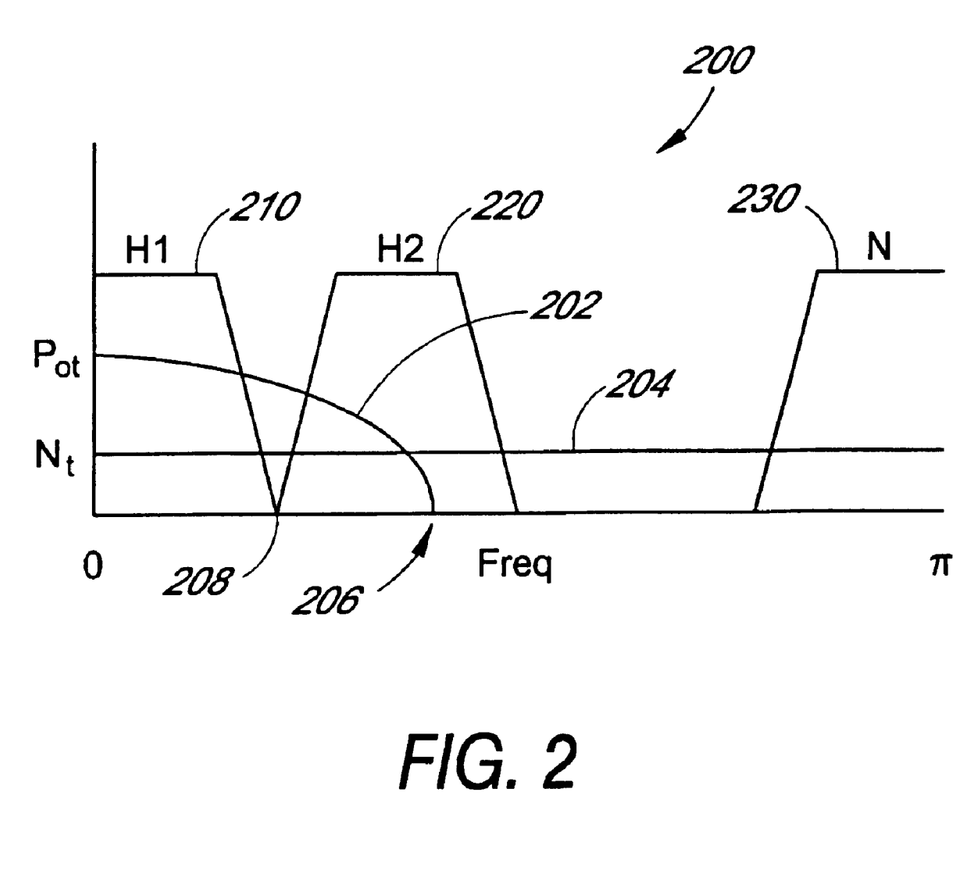
FIG. 2 shows pilot bandwidth estimation using non-overlapping signals.

A variety of factors, such as Doppler shift, multipath, or fading effects may cause the bandwidth of the pilot signal to vary. When this happens, a previously optimal pilot filter will either permit too much noise to pass, or will begin to cut off the resultant pilot signal. Therefore, it is desirable to dynamically vary the parameters of the pilot signal filter in accordance with the bandwidth of the received pilot signal. FIG. 2 shows a first technique of processing the received pilot signal in order to derive information about the pilot signal, so as to select appropriate parameters for a pilot signal filter. The received Channel signal is represented as including a pilot signal 202 and a noise signal 204. A first filter, H1 210, having a corresponding first transform function represents the response characteristics of a first bandwidth estimation filter. In FIG. 2, H1 210 is shown as a low-pass filter having a cutoff frequency 208 well below the highest frequency 206 of the pilot signal 202. It may be appreciated that another filter shape may also be used. The first filter 210 passes a corresponding first portion of the pilot signal as well as the associated noise that falls within the passband of the filter 210.

A second filter, H2 220, having a corresponding second transfer function represents the response characteristics of a second bandwidth estimation filter. The transfer function of the second filter 220 is shown in FIG. 2 as a bandpass filter, although some other filter shape may also be used. The second filter 220 passes a corresponding second portion of the pilot signal. In FIG. 2, the passband of the first filter, H1 210, is shown to not overlap the passband of the second filter, H2 220. The passband of a particular filter may be taken as a frequency where the transfer function shows an attenuation of signals by a defined amount relative to a passband frequency. A typical filter passband is defined by a −3 dB frequency, although the passband may also be defined in terms of a −6 dB frequency, −10 dB frequency or any other frequency corresponding to an attenuation level. Additionally, the transfer functions of the first filter 210 and the second filter 220 show relatively flat passbands and identical passband amplitudes. It should be understood that a relatively flat passband is not necessary and that the first filter 210 and the second filter 220 need not have identical passband characteristics. That is, the first filter 210 may have more, less, or the same passband attenuation relative to the second filter 220. Additionally, the filters may, but may not necessarily, have symmetric transfer functions.

A noise filter, N 230, having a corresponding transfer function is used as a noise estimation filter. FIG. 2 shows the transfer function of the noise filter 230 to be a high pass filter although it will be appreciated that other filter shapes may also be used. Although the noise filter 230 may be implemented as a highpass filter, it will be understood that a noise bandwidth of the received signal may be limited by additional elements (not shown) such that the noise power passed by a highpass filter is limited and not unbounded. The transfer function of the noise filter 230 is preferably selected so as to be outside the bandwidth of the pilot signal 202. In the case shown in FIG. 2, "outside" means "above" the pilot signal frequency, but in other circumstances the pilot signal 202 might not be centered on 0 Hz, in which case the noise-band filter could be placed elsewhere. The response of the noise filter 230 is selected such that the signal passed by the noise filter 230 represents a signal from which an estimate may be made of the noise in each of the pilot bandwidth estimation filters. A noise estimate may also be derived from a bandpass filter, and may overlap insignificant portions of other signals including the pilot signal, or known signals which may be predictably removed to obtain a noise estimate.

Thus, as shown by the spectrum depicted in FIG. 2, the received pilot signal is filtered by each of the first filter 210, second filter 220, and noise filter 230. Following filtering, a determination of a pilot signal component output from each of the pilot bandwidth estimation filters is made. A determination of the noise component is made from the output of the noise filter 230.

The pilot signal component may readily be determined by well-known means, such as by evaluating the power per unit bandwidth. The same type of evaluation may be performed on the output from the noise filter N 230. In one embodiment, the pilot bandwidth estimation filters and the noise filter are analog filters and the respective components are determined using a Received Signal Strength Indication (RSSI). RSSI may, for example, be determined using a diode detector. Thus, RSSI may be determined for the output of the first filter 210 to provide an estimate of the signal strength of the pilot signal and noise present within the bandwidth of the first filter 210. Similarly, the RSSI for the output of the second filter 220 provides an estimate of the signal strength of the pilot signal and noise present within the bandwidth of the second filter 220. The RSSI for the output of the noise filter 230 provides an estimate of the signal strength of the noise present within the bandwidth of the noise filter 230.

When the first filter 210, second filter 220, or noise filter 230 are implemented digitally, the respective signal or noise components may be determined digitally. The digital filters may be Finite Impulse Response (FIR), Infinite Impulse Response (IIR) or some other type of digital filters. For either FIR or IIR filter implementations, the filter order may be two or less in order to facilitate implementation in firmware. However, any filter order may be used if comparable design constraints are not present.

RSSI may be determined digitally by determining the power in the signal passed by the filter. Where the system is implemented in a system that operates in compliance with the IS-95 or CDMA 2000 standards, the signals from each of the filters may be I and Q signals in quadrature. The quadrature signals may be summed and squared and subsequently filtered to produce RSSI power estimates. Alternatively, a signal energy may be determined by squaring the amplitudes of the signal and accumulating the squared values over a predetermined period of time. In another alternative, the magnitude of the filtered signal may be determined by taking the absolute value of the filtered signal amplitudes and accumulating over a predetermined period of time. Typically, the same technique used for determining the RSSI of the pilot signal components is used for the determining the RSSI of the noise component. Using the same technique for the pilot signal components as well as for the noise components ensures that any statistical variations introduced into the RSSI value due to the RSSI technique will be the same for signal as well as noise.

Next, the determined magnitude of the first filtered pilot signal component may be compared to the magnitude of the second filtered pilot signal component. In order to improve the extent to which the determined magnitudes reflect the received pilot signal 202, the determined magnitude of the noise signal may be subtracted from the magnitudes of the filtered signals before comparing them. One way to determine and compare magnitudes is to calculate values proportional to the power per unit bandwidth of the various signals. However, other methods of determining and comparing the signal magnitudes may also be employed to achieve the same effect of deducing the bandwidth of the received pilot signal 202.

Thus, in one embodiment, the RSSI from the noise filter 230 is scaled such that an estimate of the noise power in each of the first filter 210 and the second filter 220 is obtained. For example, assume the bandwidth of the first filter 210 is twenty percent (20%) narrower than the bandwidth of the noise filter 230. The RSSI of the noise filter 230 output may be scaled by a factor of 1/(1.20) to obtain an estimate of the noise power in the first filter bandwidth. The RSSI of the noise filter 230 output may be scaled in a similar manner to align with the bandwidth of the second filter 220.

A thresholding function G(f) may be defined as a ratio of the corrected RSSI value of the first filter 210 output to the corrected RSSI value of the second filter 220 output. That is, the function G(f) may be defined as:

$$G(f) = \frac{RSSI(H2) - RSSI(N)}{RSSI(H1) - RSSI(N)} \quad \text{Eqn. 1}$$

In the example equation for G(f), RSSI(H2) represents the RSSI value determined from the output of the second filter, H2 220. Similarly, RSSI(H1) represents the RSSI value determined from the output of the first filter, H1 210, and RSSI(N) represents the RSSI value determined from the output of the noise filter, N 230. When the bandwidths of the first filter 210 and the second filter 220 differ from the bandwidth of the noise filter 230, RSSI(N) may represent a scaled noise power value. In the above example, a higher G(f) value indicates a higher pilot signal bandwidth indicating a larger pilot filter bandwidth should be used. A smaller G(f) value indicates a narrower pilot signal bandwidth and a narrower pilot filter bandwidth may be used to improve performance by minimizing in-band noise power. The pilot filter bandwidth may be updated as each value of G(f) is calculated, or may be updated on another predetermined schedule. In a communication system operating in accordance with IS-95 or CDMA 2000, the pilot filter bandwidth may be updated on a frame basis. Thus, in an IS-95 or CDMA 2000 implementation, the pilot filter bandwidth may be updated every 20 mS. The received pilot signal bandwidth is thus estimated as the signal is received and the pilot filter bandwidth adjusted on the basis of the estimate. Thus, the pilot filter bandwidth changes at substantially a real time basis.

In one embodiment, the output of the function G(f) may be thresholded against a predetermined threshold constant such that a pilot filter bandwidth is varied depending on whether G(f) is above or below the threshold. In an alternative embodiment, there may be a number of predetermined thresholds and the bandwidth of the pilot filter varied depending on which thresholds the value of G(f) falls between. In still another embodiment, the bandwidth of the pilot filter is varied continuously based on the value of G(f).

The bandwidth of an analog filter may be adjusted by varying component values of the filter elements. For example, a varactor may be used to vary capacitance values, and thus the filter bandwidth. A varactor control voltage may be varied in discrete steps or may be varied continuously. The bandwidth of a digital filter may be varied by varying the filter coefficients. The filter coefficients may be varied according to predetermined discrete values or the filter coefficients may be varied by incremental values, thus allowing for substantially continuous variations in filter bandwidth.

The embodiment illustrated in FIG. 2 is not limited to two pilot bandwidth estimation filters. Additional filters may be introduced to obtain a more detailed estimate of the received pilot signal power distribution as a function of frequency. When more than two pilot bandwidth estimation filters are implemented, a single G(f) function or multiple G(f) functions may be used. Multiple G(f) functions, each having independent thresholds may be implemented and a threshold comparison tree may be created to compare the various G(f) function values against their corresponding thresholds. The results of the comparisons may then be used to determine the desired pilot signal bandwidth. As noted earlier, if the pilot filter is implemented digitally as an IIR filter, the results of the various G(f) function values may be used to determine one or more IIR filter coefficients.

Figure 3:
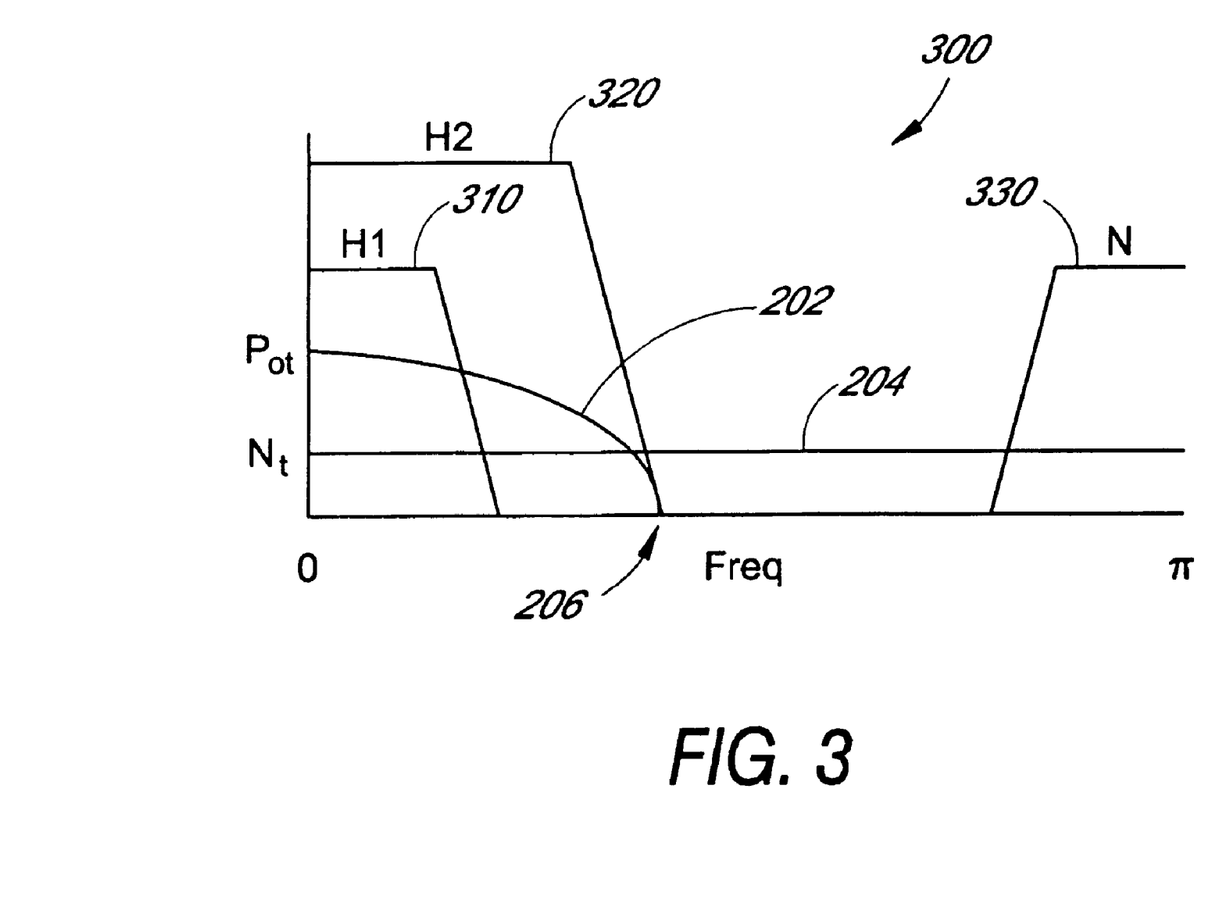
FIG. 3 shows pilot bandwidth estimation using overlapping filters.

FIG. 3 shows an example of a frequency spectrum 300 for an embodiment that is a variation of the embodiment described above in FIG. 2. A first bandwidth estimation filter H1 310, having a first transfer function, is implemented as a lowpass filter similar to that shown in FIG. 2. A second bandwidth estimation filter H2 320 has a lowpass response reflected in FIG. 3, rather than a bandpass response as shown in FIG. 2. Because both the first bandwidth estimation filter H1 310 and the second bandwidth estimation filter H2 320 are lowpass filters, the bandwidth of H2 320 encompasses H1 310. In the embodiment illustrated in FIG. 3 the filters H1 310 and H2 320 may be selected to be substantially overlapping. Although the frequency responses of the two filters H1 310 and H2 320 are shown to have differing amplitudes, it may be appreciated that the passband response of the filters may be chosen to be the same or different. A noise filter 330 is implemented outside the anticipated bandwidth of the received pilot signal 202 in order to provide an estimate of the received noise power.

It should be understood that signals produced by different filters, whether substantially overlapping or not, may also be used for deducing the shape of the pilot signal 202 in order to better select parameters for the pilot filter. Depending upon the expected spectrum of the pilot signal 202, combinations of two low-pass, two band-pass, or high-pass and band-pass filters may be appropriate.

The magnitude of the received pilot signal component output from each of the bandwidth estimation filters, H1 310 and H2 320, may be determined in a manner as described above in relation to FIG. 2. The magnitudes for the pilot signal components may be improved by adjusting the magnitude estimates to compensate for the contribution of the noise signal 204, as presumed from the magnitude estimate from the noise filter 330. Comparison of the magnitudes of the pilot signal within H1 310 and H2 320, whether compensated for noise or not, may include subtracting the magnitude obtained from H1 from the magnitude from H2.

As described in relation to the embodiment shown in FIG. 2, regardless of the method of filtering and the method used to determine the magnitudes, a comparison of two or more magnitudes may be represented in a G(f) function. G(f) may, as examples, represent a simple ratio of the magnitudes, the ratio of the magnitudes compensated for noise, or a more complex function of the magnitudes. In any of these cases, a threshold or series of thresholds may be calculated or empirically determined, and parameters of the pilot signal filter may be dynamically varied on the basis of whether G(f) exceeds a particular threshold. G(f) may also represent a more complex comparison of the magnitudes of more than two subsignals. In the case of comparison of three subsignals, for example, G(f) may represent the ratio of a slope from a second to third magnitude over a slope from a first to a second magnitude. Again, a multiplicity of subsignal magnitudes may be compared in a variety of ways to arrive at a value of G(f). Similarly, a variety of methods ranging from calculation to look-up table may be used to dynamically vary the parameters of the pilot signal filter in response to the value of G(f). G(f) may be derived from the combined results of two or more sequential measurements. The various magnitude values may be determined from sequential samples of the received pilot signal or from a single sample.

Figure 4:
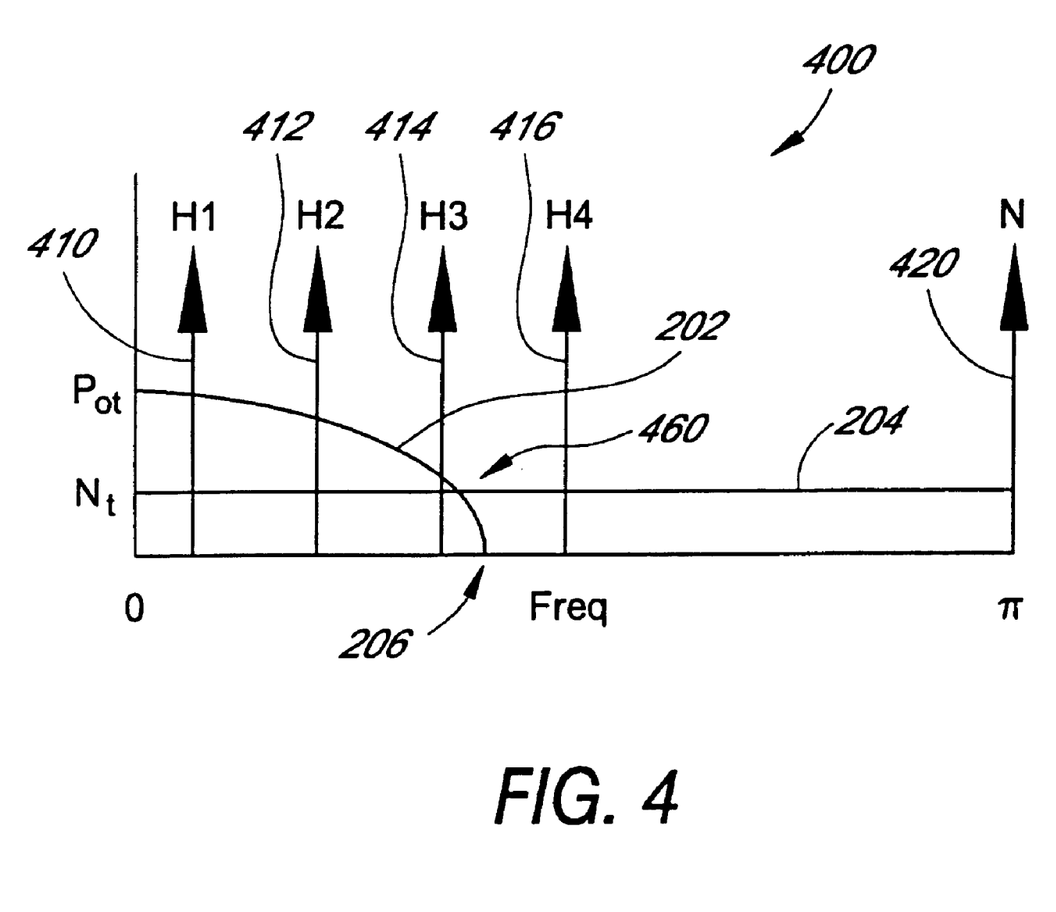
FIG. 4 shows pilot bandwidth estimation using correlations between the signal and a plurality of different sinusoids.

FIG. 4 represents an example of the frequency spectrum of another embodiment. The embodiment shown in FIG. 4 is similar to the embodiment shown in FIG. 2. A plurality of substantially non-overlapping filters are used to estimate the bandwidth of a received pilot signal 202 in the presence of noise 204. However, the filters H1 . . . H4 are correlators instead of filters. Each of the filters H1 410, H2 412, H3 414, H4 416, and N 420 are integrate and dump correlators. The integrate and dump correlators may be implemented using a Digital Signal Processor (DSP). The filters are generated by correlating the received pilot signal 202 and noise with a signal, such as a sinusoid, at the desired center frequency.

The filters H1 410, H2 412, H3 414, H4 416 and N 420 are each obtained by correlating the received pilot signal 202 and noise 204 with a rotating exponential at the center frequency of H1, H2, H3, H4 and N, respectively. Other filtering techniques may also be employed to provide what may be viewed as a series of relatively narrow band-pass, or essentially as Fourier transforms of the signal evaluated at the frequencies of interest. The integrate and dump correlators may be high order sinc ((sin x)/x) FIR filters having narrow passbands.

One may monitor changes in the bandwidth of the pilot signal 202 by measuring the signal strength at several predetermined frequency points, for example using H1-H4, which may be compensated for the noise signal strength derived from N 420. However, the correlation embodiment may also be used to evaluation only a couple of frequency bands as described in FIG. 2. A frequency 460 may be determined at which the power of the pilot signal 202 is approximately equal to the noise signal power. The parameters of pilot signal filter may then be adjusted such that the cutoff frequency is set to about the determined frequency 460.

The received signal may be represented by a series of samples $P_{ot}(n)$ at a sample frequency $f_s$. Signals H1 410 through H4 416 and N 420 are correlations between the received signal and a rotating exponential at an appropriate radian frequency ω. Each signal Hk (e.g. H1, H2, . . . ) or N may be determined as:

$$Hk = \sum_{n=0}^{L} P_{ot}(n) \cdot e^{-j\omega n/f_S} \qquad \text{Eqn. 2}$$

It may be appreciated that Eqn. 2 represents a Discrete Fourier Transform. Thus, it may be seen that the bandwidth of the correlators may be varied by adjusting the integation length L. The result is an integrate and dump correlator that is a FIR filter of order L. In order to make a good estimate, L is at least 2 and preferably 3 or more. In order to keep the computational effort low, the calculation may be simplified by the following technique. It can be shown that:

$$e^{-j(x+\Delta)} = M \cdot e^{-jx} \qquad \text{Eqn. 3}$$

where M may be determined by a complex matrix:

$$M = \begin{bmatrix} \cos(\Delta) & \sin(\Delta) \\ -\sin(\Delta) & \cos(\Delta) \end{bmatrix} \qquad \text{Eqn. 4}$$

Comparing Eqn. 3 with Eqn. 2, $\Delta = \omega/f_S$, and ω is the radian frequency of the selected signal Hk (H1, H2, etc., or N). For each sum, a value may be determined for n=0, and then subsequent values (when n=1, 2, . . . ) may be determined by multiplying the preceding value by the constant complex value M. When the computation is performed using a DSP, the values of cos(Δ) and sin(Δ) may be predetermined and stored and the complex computation may be performed in registers defined to hold the real or imaginary part of the complex computation.

The magnitudes of the pilot signal component within each filter may be determined after the correlation. Then, the resulting values may be provided to an appropriately defined G(f) function, such as those defined with respect to the embodiment of FIG. 2. The output value of the G(f) function may then be compared to a corresponding threshold to determine a pilot filter coefficient or to otherwise vary a pilot filter bandwidth.

If the pilot filter bandwidth is updated on a frame basis, there is ample time to perform the correlation and have high order sinc FIR filters with narrow passbands. The higher order filters allow for precise estimation of the received pilot signal bandwidth. As an example, a frame may represent 20 mS of time in a system having a chip rate of 1.2288 Mcps. Thus, 24,576 chips are present in any one frame.

Figure 5:
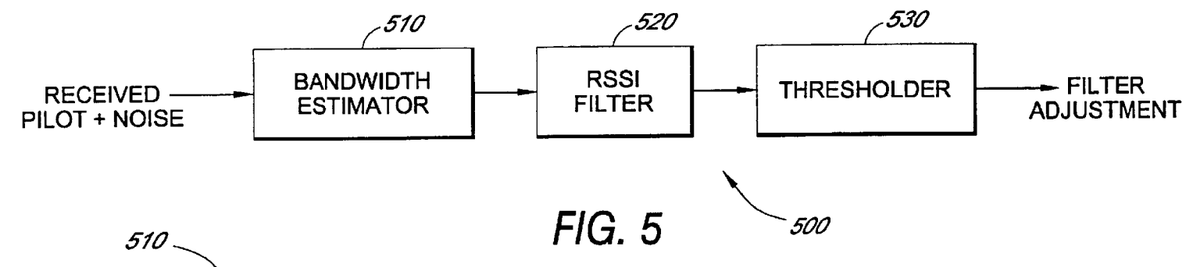
FIG. 5 is a functional block diagram of a pilot filter adjustment embodiment.

FIG. 5 shows a functional block diagram of an embodiment of a pilot filter adjustment. A received pilot signal and accompanying noise are provided to a bandwidth estimator 510. The bandwidth estimator 510 determines the bandwidth of the received pilot signal. The output of the bandwidth estimator 510 may be a single signal or a plurality of signals. The output of the bandwidth estimator 510 is coupled to a RSSI filter 520, also referred to as a magnitude estimator. The RSSI filter, or magnitude estimator, may determine the RSSI of a plurality of signals output from the bandwidth estimator 510, or may determine signal energy or magnitude of the signals. The output of the RSSI filter 520 is coupled to a thresholder 530, also referred to as a signal comparator. The thresholder 530, or signal comparator, determines the value of at least one G(f) function and compares the value against a predetermined threshold. Based on the results of this comparison, a pilot filter bandwidth adjustment is made. When the pilot filter is implemented as a digital filter, the values of the corresponding G(f) functions may be used to vary the filter coefficients. The output of the thresholder 530 may represent the actual filter coefficients, a value that may be mapped to filter coefficients, a voltage, a current, or some other signal that is may be used to adjust a bandwidth of a pilot filter.

Figure 6A:
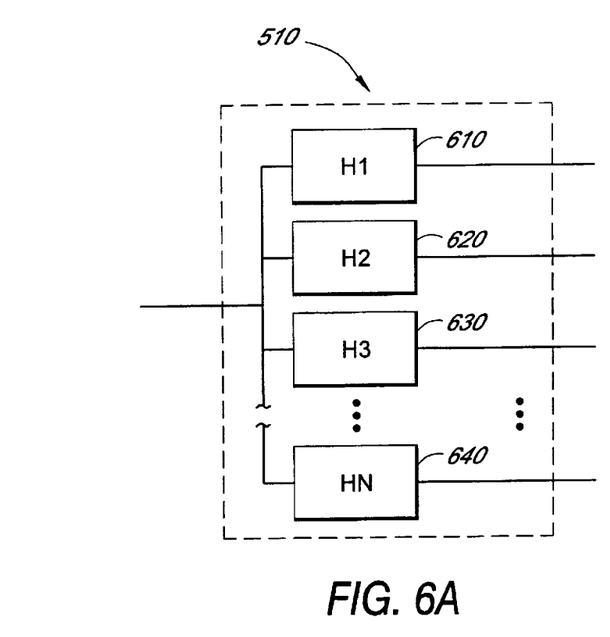
FIGS. 6A–6B show functional block diagrams of embodiments of bandwidth estimators.

FIG. 6A shows a functional block diagram of a one embodiment of a bandwidth estimator 510. In FIG. 6A, the bandwidth estimator 510 comprises a plurality of filters, H1 610 through HN 640. The frequency response of the filters may be substantially non-overlapping, as shown in FIG. 2, or may be overlapping as shown in FIG. 3.

Figure 6B:
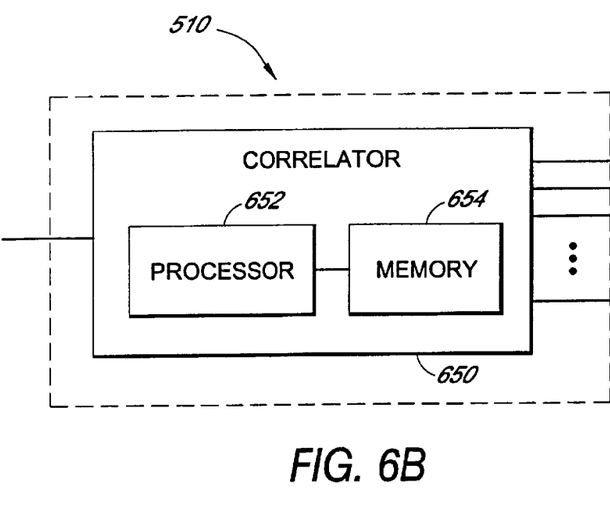

FIG. 6B shows a functional block diagram of an alternative embodiment of a bandwidth estimator 510. In FIG. 6B, the bandwidth estimator 510 comprises a correlator 650 such as described in relation to FIG. 4. The correlator 650 may, for example, comprise a processor 652 and memory 654 for generating the integrate and dump correlators.

The above embodiments are described in relation to estimating a received pilot signal bandwidth and varying a pilot filter bandwidth based in part on the estimate. However, it may be appreciated that the techniques and embodiments disclosed may be used to estimate a received signal bandwidth in a variety of communication links, and a corresponding filter bandwidth varied to allow for increased communication link performance.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile station, base station, or base station controller. In the alternative, the processor and the storage medium may reside as discrete components.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A communication apparatus comprising:
   a receiver to receive a pilot signal;
   a first filter having a corresponding passband that includes a portion of the received pilot signal bandwidth;
   a second filter having a corresponding passband;
   a magnitude estimator configured to estimate magnitude values based in part on outputs from the first and second filters;
   a signal comparator configured to compare the estimated magnitude values; and
   a pilot signal filter having a bandwidth configured to vary in part as a function of a signal comparator output.

2. The communication apparatus of claim 1, wherein the first filter is a lowpass filter.

3. The communication apparatus of claim 1, wherein the second filter is a bandpass filter having a passband that is exclusive of a passband of the first filter.

4. The communication apparatus of claim 2, wherein the second filter is a lowpass filter having a passband that substantially overlaps a passband of the first filter.

5. The communication apparatus of claim 1, wherein the first and second filters each correlate the pilot signal source with corresponding signals, wherein the corresponding signals are at different frequencies.

6. The communication apparatus of claim 1, further including a noise filter having a passband exclusive of a received pilot signal bandwidth.

7. The communication apparatus of claim 6, wherein the magnitude estimator is configured to estimate first and second signal magnitudes adjusted to exclude an estimated noise magnitude.

8. The communication apparatus of claim 1, wherein the magnitude estimator determines a value of a power output from the first and second filters.

9. The communication apparatus of claim 8, wherein the magnitude estimator determines a value reflecting an estimated power from the output of each of the first and second filters reduced by an estimate of a noise power.

10. The communication apparatus of claim 9, wherein the noise power estimate is based at least in part on a power estimate of an output of the noise filter.

11. A method of determining a filter bandwidth, the method comprising:
    receiving a pilot signal;
    filtering the received pilot signal over a plurality of different frequencies to develop a corresponding plurality of different filtered signals;
    estimating a magnitude of at least two filtered signals;
    comparing the magnitudes of at least some of the filtered signals to estimate a bandwidth of the received pilot signal; and dynamically varying a bandwidth of a pilot signal filter based in part on the magnitude comparison.

12. The method of claim 11, further comprising estimating a noise magnitude.

13. The method of claim 12, wherein estimating the magnitude of at least two filtered signals includes reducing the magnitude by a value proportional to the noise magnitude.

14. The method of claim 13, wherein the act of filtering the received pilot signal comprises lowpass and bandpass filtering.

15. The method of claim 13, wherein the act of filtering the received pilot signal comprises correlating the received pilot signal with a plurality of signals, wherein each of the plurality of signals is at a different frequency.

16. A method of determining a filter bandwidth, the method comprising:
  receiving a pilot signal:
  estimating a bandwidth of the received pilot signal; and
  varying a bandwidth of a pilot signal filter based, at least in part, or the estimated bandwidth,
  wherein estimating the bandwidth of the received pilot signal comprises
    filtering the received pilot signal with a plurality of filters;
    determining a magnitude of a signals output from each of the plurality of filters; and
    comparing the magnitudes of the signals output from the plurality of filters.

17. The method of claim 16, wherein filtering the received pilot signal comprises:
  filtering in a first filter a first frequency band of the received pilot signal; and
  filtering in a second filter a second frequency band of the received pilot signal, wherein the second frequency band is different from the first frequency band.

18. The method of claim 16, wherein the plurality of filters have non-overlapping passbands.

19. The method of claim 16, wherein at least two of the plurality of filters have overlapping passbands.

20. The method of claim 16, further comprising filtering a noise signal in a bandwidth outside of the received pilot signal bandwidth.

21. A method of determining a filter bandwidth, the method comprising:
  receiving a pilot signal;
  estimating a bandwidth of the received pilot signal; and
  varying a bandwidth of a pilot signal filter based, at least in part, or the estimated bandwidth,
  wherein estimating the bandwidth of the received pilot signal comprises
    correlating the received pilot signal with a plurality of signals to generate a plurality of filtered signals;
    determining a magnitude of at least two of the plurality of filtered signals; and
    comparing the magnitudes of the plurality of filtered signals.

22. The method of claim 21, wherein correlating the received pilot signal with the plurality of signals includes correlating the received pilot signal with a signal having a frequency greater than the received pilot signal bandwidth to generate a noise signal.

23. The method of claim 22, wherein determining the magnitude of at least two of the plurality of filtered signals comprises reducing the magnitude of the plurality of filtered signals by a value proportional to the magnitude of the noise signal.

24. The method of claim 16, wherein varying the bandwidth of the pilot signal filter comprises varying a filter coefficient value of the pilot signal filter.

25. The method of claim 16, wherein varying the bandwidth of the pilot signal filter comprises adjusting the pilot filter bandwidth once per frame of the received pilot signal.

26. A communication apparatus comprising:
  a receiver which receives a pilot signal;
  means for estimating a bandwidth of the received pilot signal; and
  means for varying a bandwidth of a pilot signal filter based, at least in part, on the estimated bandwidth, wherein the means for estimating the bandwidth of the received pilot signal comprises
    means for filtering the received pilot signal using a plurality of filters;
    means for determining a magnitude of a signal output from each of the plurality of filters; and
    means for comparing the magnitudes of the signals output from the plurality of filters.

27. An article of manufacture comprising:
  a computer usable medium having computer readable program ode means embodied therein for causing a determination of a filter bandwidth, the computer readable program code means in said article of manufacture comprising
    computer readable program code means for estimating a bandwidth a received pilot signal; and
    computer readable program code means for varying a bandwidth of a lot signal filter based, at least in part, on the estimated bandwidth, wherein estimating t bandwith of the received pilot signal comprises;
      filtering the received pilot signal using a plurality of filters;
      determining a magnitude of a signal output from each of the plurality of filters; and
      comparing the magnitudes of the signals output from the plurality of filters.

28. A program storage device readable by a machine, tangibly embodying a program of instructions executable by the machine to perform a method for determining a filter bandwidth, said method comprising:
  receiving a pilot signal;
  estimating a bandwidth of the received pilot signal; and
  varying a bandwidth of a pilot signal filter based, at least in part, on the estimated bandwidth,
  wherein estimating the bandwidth of the received pilot signal comprises
    filtering the received pilot signal using a plurality of filters;
    determining a magnitude of a signal output from each of the plurality filters; and
    comparing the magnitudes of the signals output from the plurality of filters.

29. An article of manufacture comprising:
  a computer usable medium having computer readable program code means embodied therein for causing a determination of a filter bandwidth, the computer readable program code means in said article of manufacture comprising
    computer readable program code means for estimating a bandwidth of a received pilot signal; and
    computer readable program code means for varying a bandwidth of a pilot signal filter based, at least in part, on the estimated bandwidth, wherein estimating the bandwidth of the received pilot signal comprises correlating the received pilot signal with a plurality of signals generate a plurality of filtered signals;

determining a magnitude of at least two of the plurality of filtered signals; and comparing the magnitudes of the plurality of filtered signals.

30. A program storage device readable by a machine, tangibly embodying a program of instructions executable by the machine to perform a method for determining a filter bandwidth, said method comprising:

receiving a pilot signal;

estimating a bandwidth of the received pilot signal; and varying a bandwidth of a pilot signal filter based, at least in part, on the estimated bandwidth, wherein estimating the bandwidth of the received pilot signal comprises correlating the received pilot signal with a plurality of signals to generate a plurality of filtered signals;

determining a magnitude of at least two of the plurality of filtered signals; and comparing the magnitudes of the plurality of filtered signals.

* * * * *